United States Patent [19]

Kato

[11] 4,294,950
[45] Oct. 13, 1981

[54] COATING COMPOSITION COMPRISING HYDROLYZATES FROM SILANE COMPOUNDS

[75] Inventor: Hirohisa Kato, Aichi, Japan

[73] Assignee: Ito Optical Industrial Co., Ltd., Gamagori, Japan

[21] Appl. No.: 116,946

[22] Filed: Jan. 30, 1980

[30] Foreign Application Priority Data

Feb. 16, 1979 [JP] Japan .................................. 54-17716

[51] Int. Cl.$^3$ ............................................. C08G 77/06
[52] U.S. Cl. ...................................... 528/14; 427/163;
427/164; 427/165; 427/169; 427/386; 427/387;
428/411; 428/412; 428/447; 528/12; 528/15;
528/19; 528/20; 528/21; 528/26
[58] Field of Search ............... 427/386, 387, 163, 164,
427/165, 169; 428/412, 447, 411; 525/476;
148/315; 528/15, 19, 20, 21, 14, 12, 26

[56] References Cited

U.S. PATENT DOCUMENTS

| | | | |
|---|---|---|---|
| 3,170,890 | 2/1965 | Boyd et al. .................... | 525/476 X |
| 3,491,054 | 1/1970 | Thomas .............................. | 260/33.4 |
| 3,779,988 | 12/1973 | Rembold et al. ............... | 525/476 X |
| 4,029,842 | 6/1977 | Yoshida et al. ................. | 428/447 X |
| 4,042,749 | 8/1977 | Sandvig ................................. | 428/412 |
| 4,049,867 | 9/1977 | Ito et al. .............................. | 428/412 |
| 4,069,368 | 1/1978 | Deyak et al. ........................ | 428/447 |

*Primary Examiner*—Ronald H. Smith
*Assistant Examiner*—Thurman K. Page
*Attorney, Agent, or Firm*—Armstrong, Nikaido, Marmelstein & Kubovcik

[57] ABSTRACT

A coating composition according to the invention comprises at least one compound selected from hydrolyzates of glycidoxyalkyltrialkoxysilane or (3,4-epoxycyclohexyl) alkylalkoxysilane, a compound selected from the group consisting of unsaturated or saturated polyvalent carboxylic acids or anhydrides thereof, and a curing agent. The composition is coated to the surface of plastic molded product and then cured to constitute a coating film, thereby imparting to the molded product an improved surface hardness, abrasion resistance, antistatic property, thermal resistance etc.

7 Claims, No Drawings

1

COATING COMPOSITION COMPRISING HYDROLYZATES FROM SILANE COMPOUNDS

BACKGROUND OF THE INVENTION (1) Field of the Invention

This invention relates to a coating composition of thermo-setting resins by which a coating film having excellent surface hardness, abrasion resistance, flexibility, transparency, antistatic property, dyeing property, thermal resistance, hot water resistance or the like can be formed on the surface of plastics.

(2) Description of the Prior Art

Plastic molded products have been used recently in almost every field on account of their light weight, workability and impact resistance. On the other hand, since they have the disadvantages of: weakness in surface hardness and abrasion resistance surface electrification allowing adhesion of dust and mist, and inferior thermal resistance, their practical use has not been always satisfactory.

In order to eliminate the above mentioned disadvantages, various methods for coating the surface of plastics using a hard substance have been tried. However, fully satisfactory methods have not been developed.

For example, a coating composition comprising as main constituent hydrolytic condensate of trifunctional silane such as methyltrimethoxysilane or vinyltrialkoxysilane is in commercialization and used for lenses of sunglasses. The product, however, is inferior to inorganic glass in the surface hardness and flexibility so that surface cracks occur by heating it at a temperature of more than 80° C. under stress or disclosing it outdoors. Therefore such a product is not always satisfactory.

A coating composition comprising as a main constituent alkylsilane with an epoxy group has been developed so as to eliminate these defects. However, such compositions do not maintain desirable qualities over an extended period. A coating composition comprising hydrolyzate of alkyltrialkoxysilane with an epoxy group and zinc borofluoride, tin borofluoride or boron trifluoride amine complex has been developed. However, the coating possesses insufficient water resistance. A coating composition with a reinforced film having dyeing property, for example, a composition with aluminium salt of acetylacetone as a curing agent and with an epoxy resin for providing a dyeing property has been developed, but it is inferior with respect to hot water resistance (temperature 90°–100° C.).

SUMMARY OF THE INVENTION

An object of the present invention is to provide a coating composition capable of creating a coating film on the surface of a plastic having excellent surface hardness, abrasion resistance, antistatic property and thermal resistance.

Another object of the present invention is to provide a coating composition which retains these desirable qualities over a long period of time has the long life and can be dyed by dispersion dyestuffs.

Still another object of the present invention is to provide a coating composition by which a coating film having excellent adhesion, impact resistance and hot water resistance can be formed on the surface of plastic.

The present invention pertains to a coating composition comprising a silane compound, a polyvalent carboxylic acid and a curing agent. More particularly, the invention pertains to a coating composition comprising at least one of the hydrolyzates from glycidoxyalkyltrialkoxysilane or (3,4-epoxycyclohexyl) alkylalkoxysilane, one of the unsaturated or saturated polyvalent carboxylic acids or anhydrides thereof, and a curing agent. Polyvalent carboxylic acids and anhydrides thereof condense silanol group in silane compound after the hydrolysis. Thereby bonding of polyvalent carboxylic acids and anhydrides thereof with polysiloxane permits the coating composition to be dyed and provides the coating film with excellent thermal resistance, hot water resistance and antistatic property.

Other objects of the present invention will become apparent from the following description.

DESCRIPTION OF THE PREFERRED EMBODIMENTS

This invention relates to a coating composition comprising
(A) at least one of the hydrolyzates from silicon compounds of the general formula

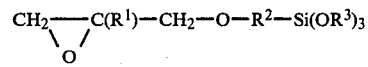

(wherein $R^1$ stands for H atom or $CH_3$ group, $R^2$ alkylene group with 1 to 4 carbon atoms, and $R^3$ alkyl group with 1 to 4 carbon atoms) or from silicon compounds of the general formula

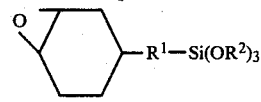

(wherein $R^1$ stands for alkylene group with 1 to 4 carbon atoms, and $R^2$ alkyl group with 1 to 4 carbon atoms);
(B) one of unsaturated or saturated polyvalent carboxylic acids or anhydrides thereof; and
(C) a curing agent.

Examples of compounds of the general formula

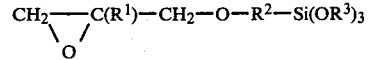

in (A) constituent of this invention are as follows:
glycidoxymethyltrimethoxysilane,
glycidoxymethyltriethoxysilane,
glycidoxymethyltripropoxysilane,
glycidoxymethyltributoxysilane,
α-glycidoxyethyltrimethoxysilane,
α-glycidoxyethyltriethoxysilane,
α-glycidoxyethyltripropoxysilane,
α-glycidoxyethyltributoxysilane,
β-glycidoxyethyltrimethoxysilane,
β-glycidoxyethyltriethoxysilane,
β-glycidoxyethyltripropoxysilane,
β-glycidoxyethyltributoxysilane,
α-glycidoxypropyltrimethoxysilane,
α-glycidoxypropyltriethoxysilane,
α-glycidoxypropyltripropoxysilane,
α-glycidoxypropyltributoxysilane,
β-glycidoxypropyltrimethoxysilane,
β-glycidoxypropyltriethoxysilane,
β-glycidoxypropyltripropoxysilane, β-glycidoxypropyltributoxysilane,
γ-glycidoxypropyltrimethoxysilane,
γ-glycidoxypropyltriethoxysilane,
γ-glycidoxypropyltripropoxysilane,
γ-glycidoxypropyltributoxysilane,
α-glycidoxybutyltrimethoxysilane,
α-glycidoxybutyltriethoxysilane,
α-glycidoxybutyltripropoxysilane,
α-glycidoxybutyltributoxysilane,
β-glycidoxybutyltrimethoxysilane,
β-glycidoxybutyltriethoxysilane,
β-glycidoxybutyltripropoxysilane,
β-glycidoxybutyltributoxysilane,
γ-glycidoxybutyltrimethoxysilane,
γ-glycidoxybutyltriethoxysilane,
γ-glycidoxybutyltripropoxysilane,
γ-glycidoxybutyltributoxysilane,
δ-glycidoxybutyltrimethoxysilane,
δ-glycidoxybutyltriethoxysilane,
δ-glycidoxybutyltripropoxysilane,
δ-glycidoxybutyltributoxysilane,
β-methylglycidoxymethyltrimethoxysilane,
β-methylglycidoxymethyltriethoxysilane,
β-methylglycidoxymethyltripropoxysilane,
β-methylglycidoxymethyltributoxysilane,
β-methyl-α-glycidoxyethyltrimethoxysilane,
β-methyl-α-glycidoxyethyltriethoxysilane,
β-methyl-α-glycidoxyethyltripropoxysilane,
β-methyl-α-glycidoxyethyltributoxysilane,
β-methyl-β-glycidoxyethyltrimethoxysilane,
β-methyl-β-glycidoxyethyltriethoxysilane,
β-methyl-β-glycidoxyethyltripropoxysilane,
β-methyl-β-glycidoxyethyltributoxysilane,
β-methyl-α-glycidoxypropyltimethoxysilane,
β-methyl-α-glycidoxypropyltriethoxysilane,
β-methyl-α-glycidoxypropyltripropoxysilane,
β-methyl-α-glycidoxypropyltributoxysilane,
β-methyl-β-glycidoxypropyltrimethoxysilane,
β-methyl-β-glycidoxypropyltriethoxysilane,
β-methyl-β-glycidoxypropyltripropoxysilane,
β-methyl-β-glycidoxypropyltributoxysilane,
β-methyl-γ-glycidoxypropyltrimethoxysilane,
β-methyl-γ-glycidoxypropyltriethoxysilane,
β-methyl-γ-glycidoxypropyltripropoxysilane,
β-methyl-γ-glycidoxypropyltributoxysilane,
β-methyl-α-glycidoxybutyltrimethoxysilane,
β-methyl-α-glycidoxybutyltriethoxysilane,
β-methyl-α-glycidoxybutyltripropoxysilane,
β-methyl-α-glycidoxybutyltributoxysilane,
β-methyl-β-glycidoxybutyltrimethoxysilane,
β-methyl-β-glycidoxybutyltriethoxysilane,
β-methyl-β-glycidoxybutyltripropoxysilane,
β-methyl-β-glycidoxybutyltributoxysilane,
β-methyl-γ-glycidoxybutyltrimethoxysilane,
β-methyl-γ-glycidoxybutyltriethoxysilane,
β-methyl-γ-glycidoxybutyltripropoxysilane,
β-methyl-γ-glycidoxybutyltributoxysilane,
β-methyl-δ-glycidoxybutyltrimethoxysilane,
β-methyl-δ-glycidoxybutyltriethoxysilane,
β-methyl-δ-glycidoxybutyltripropoxysilane, and
β-methyl-δ-glycidoxybutyltributoxysilane.
Among above mentioned, compounds including substitution group $R^2$ with 3 to 4 carbon atoms are particularly preferable.
Examples of compounds of the general formula

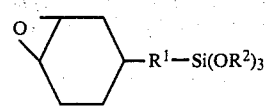

in (A) constituent are as follows:
(3,4-epoxycyclohexyl) methyltrimethoxysilane,
(3,4-epoxycyclohexyl) methyltriethoxysilane,
(3,4-epoxycyclohexyl) methyltripropoxysilane,
(3,4-epoxycyclohexyl) methyltributoxysilane,
(3,4-epoxycyclohexyl) ethyltrimethoxysilane,
(3,4-epoxycyclohexyl) ethyltriethoxysilane,
(3,4-epoxycyclohexyl) ethyltripropoxysilane,
(3,4-epoxycyclohexyl) ethyltributoxysilane,
(3,4-epoxycyclohexyl) propyltrimethoxysilane,
(3,4-epoxycyclohexyl) propyltriethoxysilane,
(3,4-epoxycyclohexyl) propyltripropoxysilane,
(3,4-epoxycyclohexyl) propyltributoxysilane,
(3,4-epoxycyclohexyl) butyltrimethoxysilane,
(3,4-epoxycyclohexyl) butyltriethoxysilane,
(3,4-epoxycyclohexyl) butyltripropoxysilane and
(3,4-epoxycyclohexyl) butyltributoxysilane.
Among above mentioned, compounds including substitution group $R^1$ with 2 to 4 carbon atoms are particularly preferable.

Silicon compounds as above mentioned are hydrolyzed in equal molar amount to that of an alkoxy group by pure water or acidic aqueous solution such as a dilute solution of hydrochloric acid. The hydrolysis may be carried out also after mixing a silicon compound with a solvent. Lower alcohols, ketones, ethers, toluene, xylene and epoxide with single functional group (such as glycidyl allyl ether, epichlorohydrine and phenylglycidyl ether) are used as the solvent. Corresponding to the object, the initial condensate is held at a temperature of 50°-80° C. for 5-8 hours (A condenser is used if the melting point of the solvent is low.) in a rapid reaction, and at 20°-35° C. for 24-48 hours in a slow reaction.

Examples of the (B) constituents according to this invention are as follows:
maleic acid,
maleic acid anhydride,
fumaric acid,
itaconic acid,
itaconic acid anhydride,
citraconic acid,
citraconic acid anhydride,
tetrahydrophthalic acid,
vanadic acid anhydride,
chloromaleic acid,
HET acid (chlorendic acid anhydride),
trimellitic acid,
trimellitic acid anhydride,
pyromellitic acid and pyromellitic acid anhydride.
Among carboxylic acids as above mentioned, maleic acid, itaconic acid, trimellitic acid and trimellitic acid anhyride are preferably used. The polyvalent carboxylic acid and anhydride thereof condense silanol group after the hydrolysis of glycidoxyalkyltrialkoxysilane and (3,4-epoxycyclohexyl) alkyltrialkoxysilane in (A) constituent. Thereby bonding of the polyvalent carboxylic acids and anhydrides thereof with polysiloxane permits the coating composition to be dyed and provides the coating film with excellent thermal resistance, hot water resistance, antistatic property, abrasion resistance and surface hardness. The effect produced by adding the (B) constituent is shown in examples which are compared with reference examples.

Curing agents (C) of this invention include imidazole compounds of the general formula

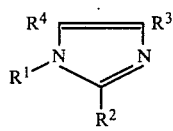

(wherein $R^1$ stands for H atom or cyanoalkyl group with 1 to 3 carbon atoms, $R^2$ H atom, phenyl group or alkyl group with 1 to 3 carbon atoms, $R^3$ H atom, alkyl group with 1 to 3 carbon atoms, cyanoalkyl group, alkoxyalkyl group or hydroxymethyl group, $R^4$ H atom, hydroxymethyl group or alkoxyalkyl group with 1 to 3 carbon atoms), dicyandiamide, metallic salt of acetylacetone of the general formula $$M(CH_2COCH_2COCH_3)_n$$

(wherein M stands for Zn(II), Co(III), Fe(III), or Cr(III), and n valence number of M:2 or 3) and Reinecke's salt.

Examples of imidazole compounds are as follows:
2-methylimidazole;
2-ethylimidazole;
2-ethyl-4-methylimidazole;
2-propylimidazole;
2-propyl-4-methylimidazole;
2-propyl-4-ethylimidazole;
2-phenylimidazole;
2-phenyl-4-methylimidazole;
1-cyanoethyl-2-methylimidazole;
1-cyanoethyl-2,4-dimethylimidazole;
1-cyanoethyl-2-propylimidazole;
1-cyanoethyl-2-phenylimidazole;
2-phenyl-4-methyl-5-hydroxymethylimidazole;
2-phenyl-4,5-dihydroxymethylimidazole and
1-cyanoethyl-2-phenyl-4,5-dicyanoethoxymethylimidazole.

Among above mentioned, compounds including cyanoalkyl group as the substitution group $R^1$, such as 1-cyanoethyl-2-methylimidazole;
1-cyanoethyl-2,4-dimethylimidazole;
1-cyanoethyl-2-propylimidazole;
1-cyanoethyl-2-phenylimidazole;
1-cyanoethyl-2-phenyl-4,5-dicyanomethylimidazole
are preferably used. Curing agents of the (C) constituent act as a curing catalyst for the epoxy group of the (A) constituent and as a promoter for polyvalent carboxylic acids and anhydrides of the (B) constituent.

Substances to be coated in compositions of this invention include molded products of plastics such as polymethylmethacrylate, polyvinyl chloride, polycarbonate, CR-39 (diethylene glycol bis allyl carbonate), cellulose acetate, cellulose propionate, ABS resin (acrylonitrile-butadiene-styrene resin), AS resin (acrylonitrile-styrene resin) and inorganic glass, wood and metal parts.

The coating may be effected by conventional manners such as brushing, rolling, spraying, spinning and dipping. Pretreatment of substances before the coating significantly improves the property of the finally cured film. Pretreatment methods include the degreasing cleaning with acid, base, surface active agent and solvent, treatment utilizing electric discharge, and ultrasonic cleaning.

A coating composition of this invention is cured by heating. Good curing result is obtained at a treating temperature ranging 60°–150° C. depending on substances to be coated, and particularly a temperature ranging 80°–100° C. is preferable so as to eliminate the influence to property of the substances. The heating for at least 2–3 hours is preferable for the good result.

Embodiments of this invention will be described together with results of the performance test. In the examples, proportion of constituents are shown in parts by weight.

Performance test of a cured film was carried out as follows:

(a) Abrasion test

Test procedure: The surface to be tested was rubbed by steel wool of #0000.
Criteria A—hardly abraded
B—abraded a little
C—abraded much (b) Appearance Visual inspection of the transparency, tint and surface state.

(c) Surface hardness

Test procedure: According to Japanese Industrial Standard JIS K-5400, the surface to be tested was scratched with a pencil scratch tester (weight: 1 kg).
Criteria: maximum pencil hardness by which the surface was not abraded (d) Hot water resistance Test procedure: The specimen to be tested was immersed in a boiled water of 100° C. for 1 hour.
Criteria: appearance and adhesion of the film etc.

(e) Dyeing property

A dyestuff of 0.4 parts (Dianix Blue BGFS manufactured by Mitsubishi Kasei Kogyo K. K.) and a surface active agent of 0.4 parts (GNK-01 manufactured by Nihon Senka Kogyo K. K.) were added to a hot water of 100 parts by weight having a temperature of 85° C., and the liquid was stirred. Thereafter, the specimen to be tested was immersed in the liquid for 30 minutes.
Criteria: tint of dyeing (f) Adhesion property Test procedure: According to Japanese Industrial Standard JIS D-0202, the specimen to be tested was cut by razor and the checked pattern of 100 sections was constituted on the surface. Peeling test was performed three times on the surface by a cellophane adhesive tape.
Criteria: number of the sections remaining after the peeling test (Note 1) Substances to be coated in embodiments:

EXAMPLES 1–4

CR-39 molded products (manufactured by Silor)
surface hardness: 2H pencil hardness
abrasion resistance: C

EXAMPLES 5-8 molded products of cellulose propionate (manufactured by Eastman-Kodack)
surface hardness: HB pencil hardness
abrasion resistance: C

EXAMPLES 9-12

As resin molded products (Tairil 769 manufactured by Asahi Dow K. K.)
surface hardness: H–HB pencil hardness
abrasion resistance: C (Note 2) Curing agents:
IM-1: 2-methylimidazole
IM-8: 2-phenyl-4-methylimidazole
IM-12: 1-cyanoethyl-2-phenylimidazole
IM-13: 2-phenyl-4-methyl-5-hidroxymethylimidazole

EXAMPLES 1-12

(1) preparation of hydrolyzate from γ-glycidoxypropyltrimethoxysilane

An aqueous solution of 0.12 N HCl of 230 parts was added to γ-glycidoxypropyltrimethoxysilane of 1,000 parts. After stirring the mixture by a stirrer at a revolution of 60 rpm for one hour, methyl alcohol of 200 parts and methylethyl ketone of 800 parts were added as a diluent and additional stirring was performed for one hour. Thereafter the liquid stood at a temperature of 25° C. for 24 hours. Thus obtained hydrolyzate is hereinafter referred to as HG-21.

(2) Preparation and coating of a composition

Itaconic acid of 90 parts was added to HG-21 of 1,000 parts and the stirring was performed at a revolution of 120 rpm for 4 hours. One of imidazole compounds listed in Table 1 was added thereto as a curing agent by 17 parts and the stirring was further performed for 2 hours, thereby a coating composition was obtained. The composition was coated to the corresponding substance to be coated in the above mentioned Note 1) by dipping method (emersion rate: 70 mm/min) and then cured under the heating condition in Table 1. The test result is shown in Table 1.

REFERENCE EXAMPLES 1-2

An imidazole compound of 17 parts listed in Table 1 was added as a curing agent to HG-21 of 1,000 parts and the stirring was performed for 2 hours, thereby a coating composition was obtained (without itaconic acid). The composition was coated to CR-39 lens of 70 mm diameter by dipping method (emersion rate: 70 mm/min) and then cured under the heating condition in Table 1. The test result is shown in Table 1.

TABLE 1

| No. | curing agent | heating condition | Abrasion | Appearance | surface hardness | hot water resistance | dyeing | adhesion |
| --- | --- | --- | --- | --- | --- | --- | --- | --- |
| Example 1 | IM-1 | 100° C. | C | a little yellow | 2H | good | good | 100/100 |
| Example 2 | IM-8 | × | C | a little yellow | 2H | good | good | 100/100 |
| Example 3 | IM-12 | 2hr | B | good | 3H | good | good | 100/100 |
| Example 4 | IM-13 |  | B | good | 3H | good | good | 100/100 |
| Example 5 | IM-1 | 80° C. | C | good | 1H | good | good | 100/100 |
| Example 6 | IM-8 | × | C | good | 1H | good | good | 100/100 |
| Example 7 | IM-12 | 3hr | B | good | 1H | good | good | 100/100 |
| Example 8 | IM-13 |  | B | good | 1H | good | good | 100/100 |
| Example 9 | IM-1 | 90° C. | C | good | 2H | good | good | 100/100 |
| Example 10 | IM-8 | × | C | good | 2H | good | good | 100/100 |
| Example 11 | IM-12 | 3hr | B | good | 2H | good | good | 100/100 |
| Example 12 | IM-13 |  | B | good | 2H | good | good | 100/100 |
| Reference 1 | IM-12 | 100° C. | C | good | HB | peeled | peeled | 0/100 |
| Reference 2 | IM-13 | × 2hr | C | good | HB | peeled | peeled | 0/100 |

EXAMPLES 13-16

Itaconic acid in 90 parts was added to HG-21 in 1,000 parts and the stirring was performed at a revolution of 120 rpm for 4 hours. One of metallic salts of acetylacetone listed in Table 2 was added thereto by 27 parts and the stirring was further performed for 2 hours, thereby a coating composition was obtained. The composition was coated to CR-39 lens of 70 mm diameter by dipping method (emersion rate: 70 mm/min) and then cured at 100° C. for 2 hours. The cured film was tested as above mentioned, and the result is shown in Table 2.

REFERENCE EXAMPLES 3-5

Aluminium salt of acetylacetone was added by amount specified in Table 2 to HG-21 in 1,000 parts, and the stirring was performed for 2 hours, thereby a coating composition was obtained. The composition was coated to CR-39 lens of 70 mm diameter by dipping method similarly to examples 13-16 and then cured at 100° C. for 2 hours. The cured film was tested similarly to examples 13-16, and the test result is shown in Table 2.

TABLE 2

| No. | curing agent type | amount (parts) | Abrasion | Appearance | surface hardness | hot water resistance | dyeing | adhesion |
| --- | --- | --- | --- | --- | --- | --- | --- | --- |
| Example 13 | acetyl acetone Zn | 27 | C | good | 4H | good | good | 100/100 |
| Example 14 | acetyl acetone Co | 27 | B | " | 4H | " | " | 100/100 |

TABLE 2-continued

| | curing agent | | test result | | | | | |
|---|---|---|---|---|---|---|---|---|
| No. | type | amount (parts) | Abrasion | Appearance | surface hardness | hot water resistance | dyeing | adhesion |
| Example 15 | acetyl acetone Fe | 27 | B | " | 4H | " | " | 100/100 |
| Example 16 | acetyl acetone Cr | 27 | C | " | 3H | " | " | 100/100 |
| Reference 3 | acetyl acetone Al | 9 | C | good | 1H | peeled | peeled | 0/100 |
| Reference 4 | acetyl acetone Al | 18 | B | " | 2H | " | " | 0/100 |
| Reference 5 | acetyl acetone Al | 27 | A | " | 4H | " | " | 0/100 |

Similar result to above mentioned was obtained also in the case of coating to glass, acryl resin, cellulose propionate, ABS molded product of 40×40×2 (mm).

EXAMPLE 17

Itaconic acid of 90 parts was added to HG-21 of 1,000 parts, and the stirring was carried out at 120 rpm for 4 hours. Dicyandiamide of 27 parts was added thereto as a curing agent and the stirring was further carried out for 2 hours, thereby a coating composition was obtained. The composition was coated to a plate of acryl resin (Acrylite L manufactured by Mitsubishi Rayon K. K.) of 80×80×2 (mm) by dipping method (emersion rate: 70 mm/min) and then cured by heating at 90° C. for 2 hours. Test result in similar manner was the abrasion resistance: A, apperance: good, surface hardness: 4H, hot water resistance: good, dyeing property: good, adhesion: 100/100. Similar result was obtained also in the case of coating to CR-39, cellulose propionate, AS resin and glass.

EXAMPLE 18

Itaconic acid of 90 parts was added to HG-21 of 1,000 parts, and the stirring was carried out at 120 rpm for 4 hours. Reinecke's salt of ammonium of 8 parts was added thereto as a curing agent and the stirring was further carried out for 2 hours, thereby a coating composition was obtained. The composition was coated to a plate of cellulose propionate of 80×80×2 (mm) by dipping method (emersion rate: 70 mm/min) and then cured by heating at 80° C. for 3 hours. The test result was the abrasion resistance: A, appearance: good, surface hardness: 3H, hot water resistance: good: dyeing property: good, adhesion 100/100.

EXAMPLES 19-22

Trimellitic acid anhydride of 22.5 parts was added to HG-21 of 1,000 parts, and the stirring was carried out at 120 rpm for 4 hours. One of metallic salts of acetylacetone listed in Table 3 was added thereto by 22.5 parts as a curing agent and the stirring was further carried out for 2 hours, thereby a coating composition was obtained. The composition was coated to a plate of AS resin of 40×40×2 (mm) by dipping method (emersion rate: 70 mm/min) and then cured by heating at 90° C. for 2 hours. The test result is shown in Table 3.

TABLE 3

| | curing agent | | test result | | | | | |
|---|---|---|---|---|---|---|---|---|
| No. | type | amount (parts) | abrasion | appearance | surface hardness | hot water resistance | dyeing | adhesion |
| Example 19 | acetyl acetone Zn | 22.5 | C | good | 4H | good | good | 100/100 |
| Example 20 | acetyl acetone Co | " | B | " | 4H | " | " | 100/100 |
| Example 21 | acetyl acetone Fe | " | B | " | 4H | " | " | 100/100 |
| Example 22 | acetyl acetone Cr | " | C | " | 3H | " | " | 100/100 |

EXAMPLE 23

Trimellitic acid anhydride of 22.5 parts was added to HG-21 of 1,000 parts, and the stirring was carried out at 120 rpm for 4 hours. Dicyandiamide of 22.5 parts was added thereto as a curing agent and the stirring was further carried out for 2 hours, thereby a coating composition was obtained. The composition was coated to CR-39 lens of 70 mm diameter by dipping method (emersion rate: 70 mm/min) and then cured by heating at 100° C. for 2 hours. The test result was the abrasion resistance: A, appearance: good, surface hardness: 2H, hot water resistance: good, dyeing property: good, adhesion: 100/100.

EXAMPLES 24-27

HET acid (chlorendic acid) anhydride of 45 parts was added to HG-21 of 1,000 parts, and the stirring was carried out at 120 rpm for 4 hours. One of metalic salts of acetylacetone listed in Table 4 was added thereto by 27 parts as a curing agent and the stirring was further carried out for 2 hours, thereby a coating composition was obtained. The composition was coated to CR-39 lens of 70 mm diameter by dipping method (emersion rate: 35 mm/min) and then cured by heating at 100° C. for 2 hours. The test result is shown in Table 4.

TABLE 4

| No. | curing agent type | amount (parts) | abrasion | appearance | surface hardness | hot water resistance | dyeing | adhesion |
|---|---|---|---|---|---|---|---|---|
| Example 24 | acetyl acetone Zn | 27 | C | good | 2H | good | good | 100/100 |
| Example 25 | acetyl acetone Co | " | B | " | 3H | " | " | 100/100 |
| Example 26 | acetyl acetone Fe | " | B | " | 3H | " | " | 100/100 |
| Example 27 | acetyl acetone Cr | " | C | " | 2H | " | " | 100/100 |

EXAMPLE 28

HET acid (chlorendic acid) anhydride of 45 parts was added to HG-21 of 1,000 parts, and the stirring was carried out at 120 rpm for 4 hours. Dicyandiamide of 27 parts was added thereto as a curing agent and the stirring was further carried out for 2 hours, thereby a coating composition was obtained. The composition was coated to cellulose propionate lens of 70 mm diameter by dipping method (emersion rate: 35 mm/min) and then cured by heating at 80° C. for 2 hours. The test result was the abrasion resistance: B, appearance: good, surface hardness: 1H, hot water resistance: good, dyeing property: good, adhesion 100/100. Similar result was obtained also in the case of coating to glass, CR-39, AS resin and acryl resin.

EXAMPLES 29-32

Maleic acid anhydride of 22.5 parts was added to HG-21 of 1,000 parts, and the stirring was carried out at 120 rpm for 4 hours. One of metallic salts of acetylacetone listed in Table 5 was added thereto by 22.5 parts as a curing agent and the stirring was further carried out for 2 hours. Thus obtained composition was coated to a glass plate of 80×80×2 (mm) by dipping method (emersion rate: 70 mm/min) and then cured by heating at 100° C. for 2 hours. The test result is shown in Table 5.

was the abrasion resistance: B, appearance: a little yellow, hot water resistance: good, dyeing property: good, adhesion: good. Similar result was obtained also in the case of coating to glass, CR-39 and acryl resin.

EXAMPLES 34-37

(1) Preparation of hydrolyzate from (3,4-epoxycyclohexyl) ethyltrimethoxysilane

Glycidyl methacrylate of 200 parts and methylethyl ketone of 800 parts were added to (3,4-epoxycyclohexyl) ethyltrimethoxysilane of 1,000 parts, and the stirring was carried out by a stirrer at 60 rpm for 30 minutes. An aqueous solution of 0.12 N HCl of 230 parts was added thereto and the stirring was further carried out for one hour. And then the liquid stood at 25° C. for 24 hours. Thus obtained hydrolyzate is hereinafter referred to as HE-5.

(2) Preparation and coating of a composition

Itaconic acid of 90 parts was added to HE-5 of 1,000 parts and the stirring was carried out at 120 rpm for 4 hours. One of imidazole compounds listed in Table 6 was added thereto as a curing agent by 7 parts and the stirring was further carried out for 2 hours, thereby a coating composition was obtained. The composition was coated to a plate of acryl resin of 80×80×2 (mm) by dipping method (emersion rate: 35 mm/min) and then cured by heating at 90° C. for 2 hours. The test

TABLE 5

| No. | curing agent type | amount (parts) | abrasion | appearance | surface hardness | hot water resistance | dyeing | adhesion |
|---|---|---|---|---|---|---|---|---|
| Example 29 | acetyl acetone Zn | 22.5 | B | a little yellow | 3H | good | good | 100/100 |
| Example 30 | acetyl acetone Co | 22.5 | B | a little yellow | 3H | " | " | 100/100 |
| Example 31 | acetyl acetone Fe | 22.5 | B | a little yellow | 3H | " | " | 100/100 |
| Example 32 | acetyl acetone Cr | 22.5 | B | a little yellow | 3H | " | " | 100/100 |

EXAMPLE 33

Maleic acid anhydride of 22.5 parts was added to HG-21 of 1,000 parts, and the stirring was carried out at 120 rpm for 4 hours. Reinecke's salt of ammonium of 8 parts was added thereto as a curing agent and the stirring was further carried out for 2 hours, thereby a coating composition was obtained. The composition was coated to a plate of AS resin of 40×40×2 (mm) by dipping method (emersion rate: 70 mm/min) and then cured by heating at 90° C. for 2 hours. The test result result is shown in Table 6.

REFERENCE EXAMPLES 6-7

An imidazole compound listed in Table 6 was added to HE-5 of 1,000 parts and the stirring was carried out for 2 hours. Thus obtained composition was coated to a plate of acryl resin of 80×80×2 (mm) by dipping method (emersion rate: 35 mm/min) and then cured by heating at 90° C. for 2 hours. The test result is shown in Table 6.

TABLE 6

| No. | curing agent type | amount (parts) | abrasion | appearance | surface hardness | hot water resistance | dyeing | adhesion |
|---|---|---|---|---|---|---|---|---|
| Example 34 | IM-1 | 7 | C | a little yellow | 2H | good | good | 100/100 |
| Example 35 | IM-8 | 7 | C | a little yellow | 2H | " | " | 100/100 |
| Example 36 | IM-12 | 7 | B | a little yellow | 3H | " | " | 100/100 |
| Example 37 | IM-13 | 7 | B | a little yellow | 3H | " | " | 100/100 |
| Reference 6 | IM-12 | 7 | C | a little yellow | HB | peeled | peeled | 0/100 |
| Reference 7 | IM-13 | 7 | C | a little yellow | HB | " | " | 0/100 |

EXAMPLE 38

Itaconic acid of 90 parts was added to HE-5 of 1,000 parts, and the stirring was carried out at 120 rpm for 4 hours. Dicyandiamide of 27 parts was added thereto as a curing agent and the stirring was further carried out for 2 hours, thereby a coating composition was obtained. The composition was coated to a glass plate of 80×80×2 (mm) by dipping method (emersion rate: 35 mm/min) and then cured by heating at 100° C. for 2 hours. The test result was the abrasion resistance: A, appearance: good, surface hardness: 4H, hot water resistance: good, dyeing property: good, adhesion: 100/100. Similar result was obtained also in the case of coating to CR-39, acryl resin, AS resin and cellulose propionate.

EXAMPLES 39–42

Trimellitic acid anhydride of 22.5 parts was added to HE-5 of 1,000 parts, and the stirring was carried out at 120 rpm for 4 hours. One of metallic salts of acetylacetone listed in Table 7 was added thereto by 22.5 parts as a curing agent and the stirring was further carried out for 2 hours, thereby a coating composition was obtained. The composition was coated to a plate of AS resin of 40×40×2 (mm) by dipping method (emersion rate: 70 mm/min) and then cured by heating at 90° C. for 2 hours. The test result is shown in Table 7.

TABLE 7

| No. | curing agent type | amount (parts) | abrasion | appearance | surface hardness | hot water resistance | dyeing | adhesion |
|---|---|---|---|---|---|---|---|---|
| Example 39 | acetyl acetone Zn | 22.5 | C | good | 3H | good | good | 100/100 |
| Example 40 | acetyl acetone Co | 22.5 | C | " | 3H | " | " | 100/100 |
| Example 41 | acetyl acetone Fe | 22.5 | B | " | 3H | " | " | 100/100 |
| Example 42 | acetyl acetone Cr | 22.5 | C | " | 2H | " | " | 100/100 |

Similar result was obtaind also in the case of coating to glass, CR-39, acryl resin and cellulose propionate.

EXAMPLE 43

Trimellitic acid anhydride of 22.5 parts was added to HE-5 of 1,000 parts, and the stirring was carried out at 120 rpm for 4 hours. Dicyandiamide of 22.5 parts was added thereto as a curing agent and the stirring was further carried out for 2 hours, thereby a coating composition was obtained. The composition was coated to CR-39 lens of 70 mm diameter by dipping method (emersion rate: 35 mm/min) and then cured by heating at 100° C. for 2 hours. The test result was the abrasion resistance: A, appearance: good, surface hardness: 4H, hot water resistance: good, dyeing property: good, adhesion: 100/100.

What is claimed is:

1. A coating composition comprising:
   (A) at least one hydrolyzate selected from the group consisting of a hydrolyzate of a silicon compound of the general formula

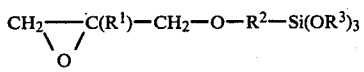

wherein $R^1$ is hydrogen or $CH_3$, $R^2$ is alkylene of 1–4 carbon atoms, and $R^3$ is alkyl of 1–4 carbon atoms, and a hydrolyzate of a silicon compound of the general formula

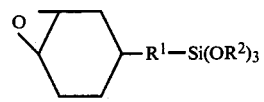

wherein $R^1$ is alkylene of 1–4 carbon atoms and $R^2$ is alkyl of 1–4 carbon atoms;

(B) a compound selected from the group consisting of unsaturated and saturated polyvalent carboxylic acids and anhydrides thereof; and
   (C) a curing agent.

2. A coating composition according to claim 1, wherein said silicon compound of the general formula

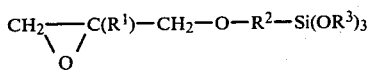

is γ-glycidoxypropyltrimethoxysilane.

3. A coating composition according to claim 1, wherein said silicon compound of the general formula

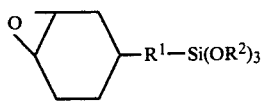

is (3,4-epoxycyclohexyl) ethyltrimethoxysilane.

4. A coating composition acording to claims 1, 2 or 3, wherein said polyvalent carboxylic acid is selected from the group consisting of itaconic acid, trimellitic acid anhydride, HET acid anhydride and maleic acid anhydride.

5. A coating composition according to claim 4, wherein said curing agent is selected from the group consisting of 2-methylimidazole, 2-phenyl-4-methylimidazole, 1-cyanoethyl-2-phenylimidazole and 2-phenyl-4-methyl-5-hydroxymethylimidazole.

6. A coating composition comprising:
(A) At least one hydrolyzate selected from the group consisting of a hydrolyzate of a silicon compound of the general formula

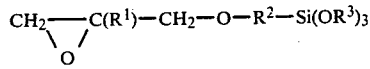

wherein $R^1$ is a hydrogen or $CH_3$, $R^2$ is alkylene of 1-4 carbon atoms, and $R^3$ is alkyl of 1-4 carbon atoms, and a hydrolyzate of a silicon compound of the general formula

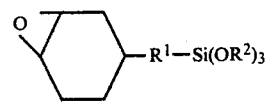

wherein $R^1$ is alkylene of 1-4 carbon atoms and $R^2$ is alkyl of 1-4 carbon atoms;
(B) a polycarboxylic acid or an anhydride thereof, the polycarboxylic acid being selected from the group consisting of itaconic acid, trimellitic acid, HET acid and maleic acid; and
(C) a curing agent selected from the group consisting of dicyandiamide, Reinecke's salt and a metallic salt of acetylacetone.

7. A coating composition as defined in claim 6 wherein the polycarboxylic acid of (B) is selected from the group consisting of itaconic acid and trimellitic acid and wherein the curing agent (C) is selected from the group consisting of dicyandiamide and Reinecke's salt.

* * * * *